(12) United States Patent
Saboungi et al.

(10) Patent No.: US 6,967,011 B1
(45) Date of Patent: Nov. 22, 2005

(54) METHOD FOR SYNTHESIZING EXTREMELY HIGH-TEMPERATURE MELTING MATERIALS

(75) Inventors: Marie-Louise Saboungi, Chicago, IL (US); Benoit Glorieux, Perpignan (FR)

(73) Assignee: The United States of America as represented by the United States Department of Energy, Washington, DC (US)

( * ) Notice: Subject to any disclaimer, the term of this patent is extended or adjusted under 35 U.S.C. 154(b) by 364 days.

(21) Appl. No.: 10/307,478

(22) Filed: Dec. 2, 2002

(51) Int. Cl.[7] ............................................. C01B 35/04
(52) U.S. Cl. ................... 423/249; 423/250; 423/251; 423/252; 423/254; 423/263; 423/289; 423/297; 423/439; 423/440; 423/592.1; 423/593.1
(58) Field of Search ............................. 423/289, 297, 423/249, 250, 251, 252, 254, 263

(56) References Cited

U.S. PATENT DOCUMENTS

| | | | | |
|---|---|---|---|---|
| 4,851,262 A | * | 7/1989 | McFeaters | 427/217 |
| 5,176,890 A | * | 1/1993 | Iltis et al. | 423/263 |
| 5,749,937 A | * | 5/1998 | Detering et al. | 75/10.19 |
| 6,409,797 B2 | * | 6/2002 | Armstrong et al. | 75/343 |
| 6,830,738 B1 | * | 12/2004 | Lupinetti et al. | 423/249 |

OTHER PUBLICATIONS

"What Is New on the Levitation Front?", Journal of Non-Crystalline Solids, vol. 312-314, p. 297-298, Souboungi et al., Oct. 2002.
US 5,059,563, 10/1991, Khazai et al. (withdrawn)

* cited by examiner

*Primary Examiner*—Wayne A. Langel
(74) *Attorney, Agent, or Firm*—Brian J. Lally; Daniel D. Park; Paul A. Gottlieb

(57) ABSTRACT

The invention relates to a method of synthesizing high-temperature melting materials. More specifically the invention relates to a containerless method of synthesizing very high temperature melting materials such as borides, carbides and transition-metal, lanthanide and actinide oxides, using an Aerodynamic Levitator and a laser. The object of the invention is to provide a method for synthesizing extremely high-temperature melting materials that are otherwise difficult to produce, without the use of containers, allowing the manipulation of the phase (amorphous/crystalline/metastable) and permitting changes of the environment such as different gaseous compositions.

8 Claims, 4 Drawing Sheets

Schematics of aerodynamic levitation

Levitation gas: $O_2$, Ar, $Ar/H_2$, etc

Schematics of aerodynamic levitation

Levitation gas: $O_2$, Ar, Ar/$H_2$, etc

Fig. 2A
Illustration
Temperature
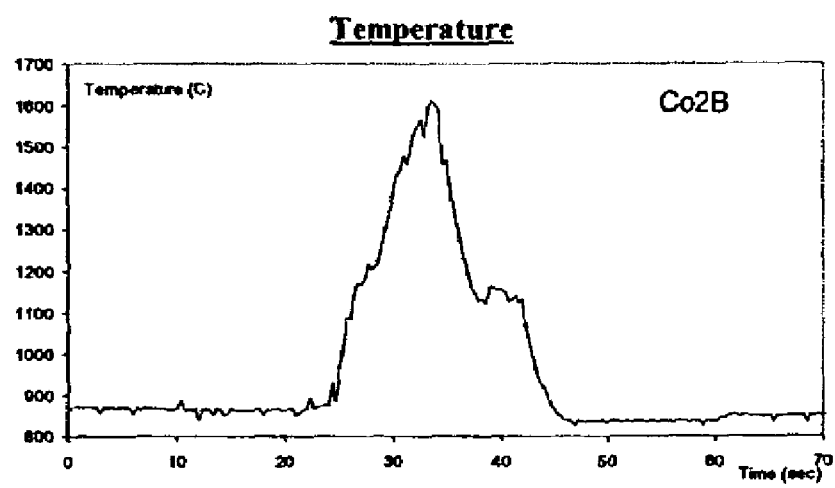
X Ray diffraction
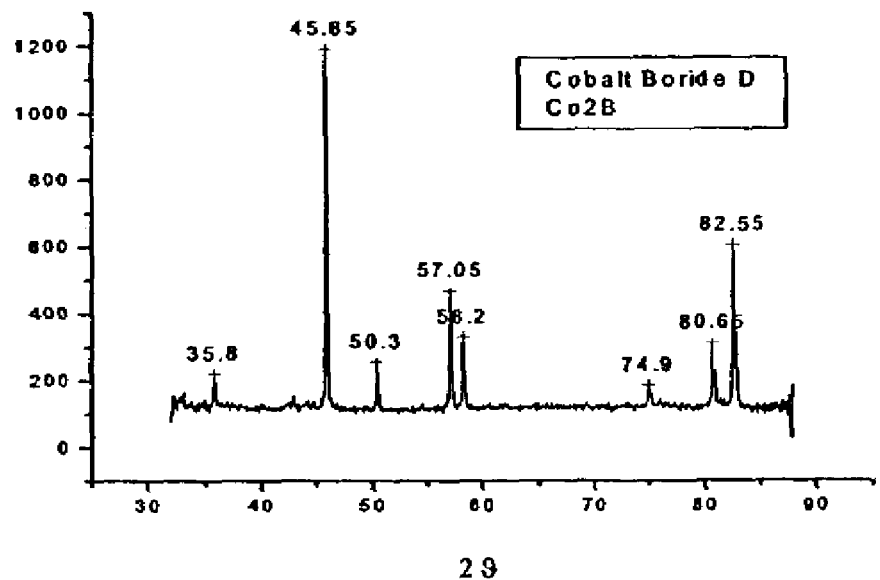
Fig. 2B Fig. 4A (V+1.2% of Fe)
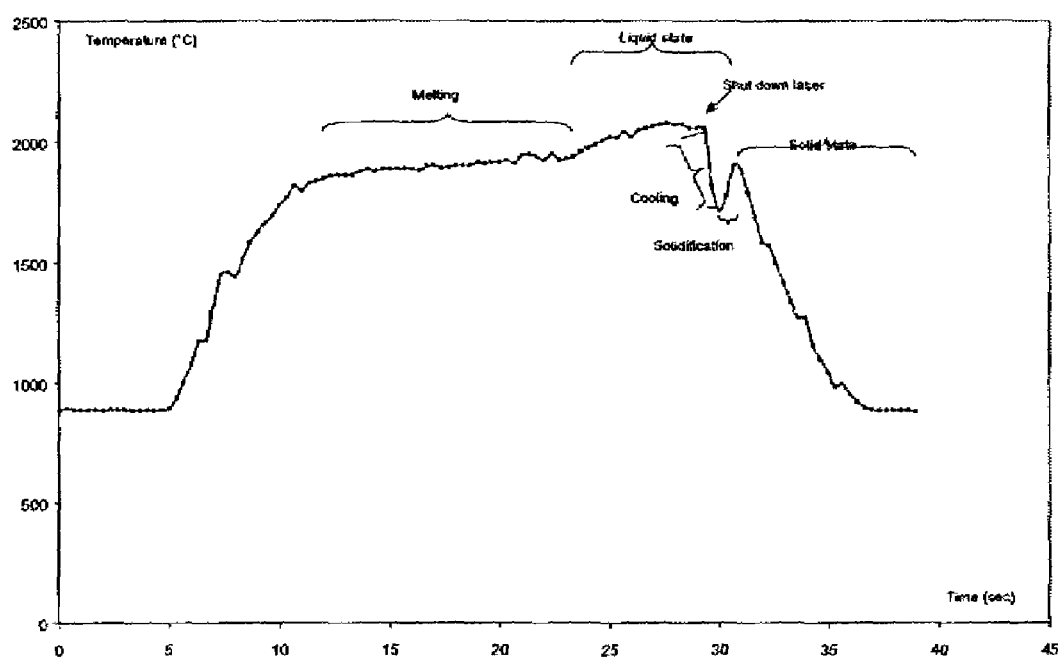
Fig. 4B (Fe$_2$B)
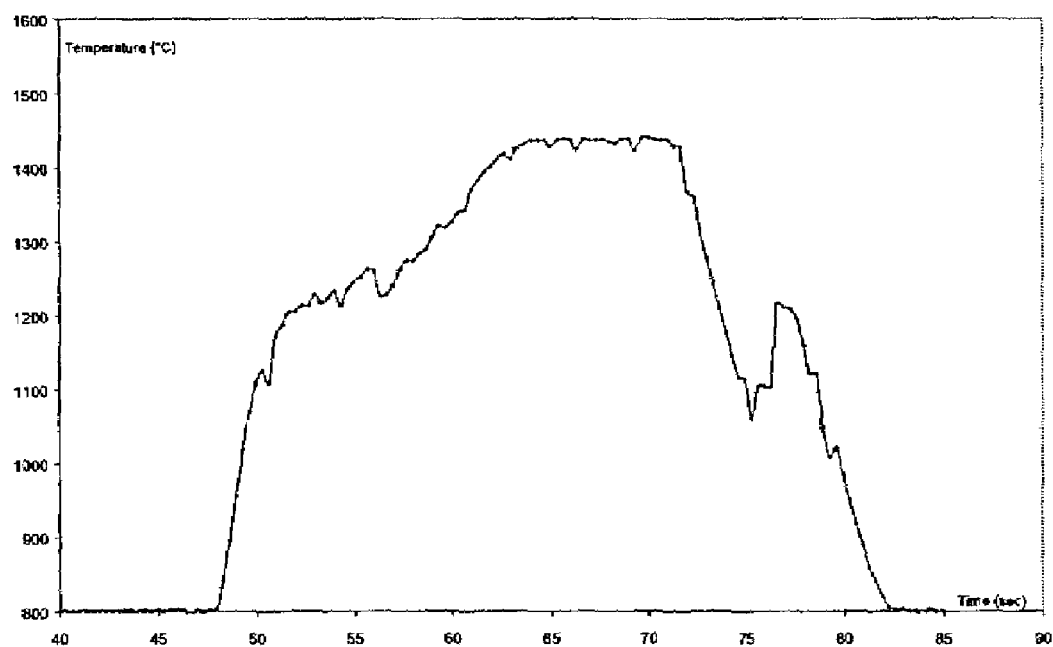

METHOD FOR SYNTHESIZING EXTREMELY HIGH-TEMPERATURE MELTING MATERIALS

U.S. GOVERNMENT RIGHTS

The United States Government has rights in this invention pursuant to Contract No. W-31-109-ENG-38 between the U.S. Department of Energy and the University of Chicago, representing Argonne National Laboratory.

TECHNICAL FIELD

The invention relates to a method of synthesizing high-temperature melting materials. More specifically the invention relates to a containerless method of synthesizing very high temperature melting materials such as borides, carbides and transition-metal, lanthanide and actinide oxides, using an Aerodynamic Levitator and a laser.

BACKGROUND OF THE INVENTION

Recent developments in the area of material science, including the discovery of high-temperature superconductors like $MgB_2$, have created a renewed interest in a variety of extremely high-temperature melting materials including large classes of boride, carbide and oxide ceramics, as well as other ceramics, metals, semiconductors and glasses. Besides their potential use in superconductor and semiconductor applications, very high-temperature melting materials are used in lightweight armor ($AlB_2$, $TiB_2$), nuclear applications to control neutron release ($B_4C$, $BN$), wear-resistant coatings for metals and steel ($Fe_2B$) and several other applications. Unfortunately, synthesis of such extremely high-temperature melting materials using traditional methods has proved extremely difficult.

Traditional methods for synthesizing very high-temperature melting materials call for material synthesis to be carried out in some sort of container (see, Khazai et al., U.S. Pat. No. 5,059,653). Unfortunately, the extremely high-temperatures required to produce such materials cause the containers themselves to interact chemically with the reactants. This interaction between the container and the reactants leads to the presence of impurities in the final products.

There is a need for a containerless method for synthesizing extremely high-temperature melting materials. Furthermore, there is a need for a process that allows one to manipulate the phase (crystalline, amorphous or metastable) of the synthesized product. It is often difficult to produce amorphous borides using traditional techniques. An advantage of containerless methods is that they avoid heterogeneous nucleation and thus make it easier to obtain amorphous and metastable crystalline phases.

OBJECTS OF THE INVENTION

An object of the invention is to provide a method for synthesizing extremely high-temperature melting materials that are otherwise difficult to produce.

Another object of the invention is to provide a method for synthesizing extremely high-temperature melting materials without the use of containers.

Another object of the invention is to provide a method for synthesizing extremely high-temperature melting materials that allows the manipulation of the phase (amorphous/crystalline/metastable).

Another object of the invention is to provide a method for synthesizing extremely high-temperature melting materials that allows one to change the reaction environment, such as different gaseous compositions.

BRIEF DESCRIPTION OF THE DRAWINGS

FIG. 2A shows a graph of temperature v. time for the synthesis of $Co_2B$ from cobalt (Co) and boron (B), in stoichiometric amounts, using the present process (sample C);

FIG. 2B shows the X-ray diffraction pattern of the material produced ($Co_2B$) by the reaction between Co and B, in stoichiometric amounts, using the present process;

FIG. 4A shows a graph of temperature v. time for the synthesis of $V_{0.988}Fe_{0.012}$ from vanadium (V) and iron (Fe), in stoichiometric amounts, using the present process;

FIG. 4B shows a graph of temperature v. time for the synthesis of $Fe_2B$ from Fe and B, in stoichiometric amounts, using the present process.

DETAILED DESCRIPTION OF THE PREFERRED EMBODIMENTS

Figure 1:
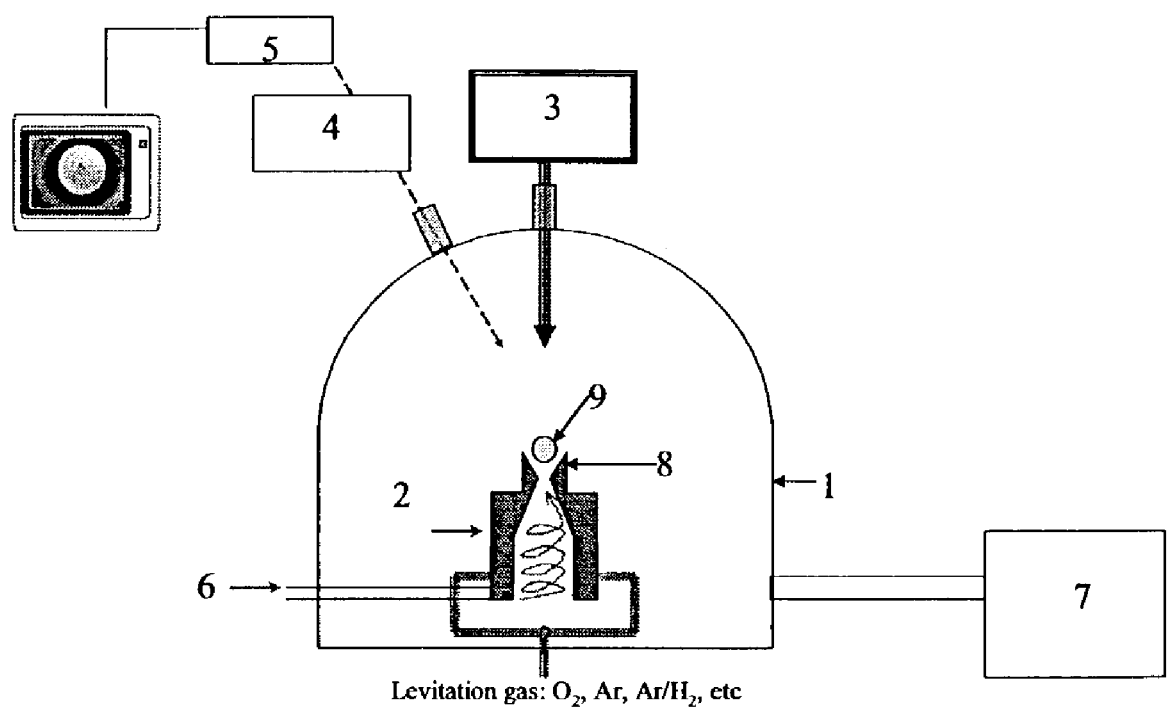
FIG. 1 shows a schematic view of an Aerodynamic Levitator comprising a levitation chamber, conical nozzle, gas laser, pyrometer, camera, water cooling system, and a vacuum pump.

The present invention discloses a method for preparing extremely high-temperature melting materials that allows one to control the phase (crystalline or amorphous) of the resulting materials. More specifically, the invention relates to a process for the synthesis of extremely high-temperature melting materials, including large classes of borides, carbides and oxides comprising the steps of:

1. Preparing the reactants;
2. Levitating the reactants;
3. Heating the reactants using a gas laser;
4. Cooling the resulting compound.

The initial step in the present process involves the preparation of the reactants for use in an Aerodynamic Levitator (details of the Levitator to be described later). The preparation of the reactants is important to the formation of the desired compounds using a levitator.

The reactants can be prepared using a variety of methods depending on the type of reactants used. The preferred way to prepare the reactants is to carefully weigh and mix stoichiometric amounts of powdered forms of the required elements (or compounds) and then press the mixed powders into a rounded pellet. For example, preparing the reactants used to synthesize CoB would involve (1) mixing stoichiometric quantities of powdered cobalt (Co) and powdered boron (B) and then physically pressing the powder mixture into a round pellet using a powder compressor. It should be noted that the pellet should not be greater than 3 mm in diameter if used with the levitator described in this specification, however, larger pellets could be used with a larger levitator.

Alternatively, the reactant elements/compounds can be physically combined in other ways to form a ball of wire, foil or other form for use as the levitating specimen. However, combining the reactants into a single spherical shape (as taught agove) facilitates the levitation process. Table 1 shows the type and ratio of reactants used to synthesize certain boride compounds using the present process.

It is important to note that while the present examples illustrate how to synthesize high-temperature borides the same process can be utilized to synthesize other very high-temperature melting materials including certain carbides, oxides, and other ceramics and glasses (as long as they have a low vapor pressure).

The purity of the reactants is not a serious issue because most impurities have a high vapor pressure and will be removed during the laser heating.

TABLE 1

Examples of Borides formed by the Present Process
Levitation under argon 99.999% pure at 30%–50% of full laser power

| Sample | Weight of Metal (mg) | Weight of B (mg) | Final Weight (mg) | Weight Loss (mg) | End Product |
|---|---|---|---|---|---|
| CoB (A) | 52.35 | 2.13 | 54.40 | 0.08 | $Co_{81.5}B_{18.5}$ |
| CoB (B) | 64.52 | 3.96 | 68.20 | 0.28 | $Co_3B$ |
| CoB | 30.63 | 2.85 | 33.26 | 0.22 | $Co_2B$ |
| CoB (D) | 30.00 | 2.75 | 32.75 | 0.00 | $Co_2B$ |
| CoB (F) | 42.34 | 7.55 | 49.66 | 0.23 | CoB |
| CoB (G) | 40.8 | 11.71 | 52.50 | 0.01 | $Co_{39}B_{61}$ |
| FeB (B) | 42.50 | 1.66 | 43.95 | 0.21 | $Fe_{83}B_{17}$ |
| FeB (C) | 46.31 | 4.56 | 50.58 | 0.29 | $Fe_2B$ |
| FeB (D) | 45.93 | 9.25 | 54.99 | 0.19 | FeB |
| FeB (E) | 42.26 | 14.51 | 56.64 | 0.13 | $Fe_{36}B_{64}$ |

CoB

Because of the extreme temperature employed in the present process, the technique is limited to materials having a lower vapor pressure. Given the extremely high-temperatures employed by the present process, materials having high vapor pressure would evaporate.

The second step in the present process is to place the reactants onto the conical nozzle 2 of the levitation apparatus shown in FIG. 1 (levitation apparatus to be described in detail later). The reactants are placed on the conical nozzle 2 using a tweezers, pliers or similar device, so as to minimize the possibility of contamination.

Before the reactants can be levitated, the levitation chamber 1 is cleared of any potentially contaminating gas/material using a vacuum pump 7. The levitation chamber can then be filled with the same gas or mixture of gases that will be used to levitate the pellet. Filling the chamber with the same gas/gas mixture used to levitate decreases the possibility of contamination and/or unwanted reactions that may occur in uncontrolled environments.

The next step of the process is to levitate the reactant pellet using the Aerodynamic Levitator (AL). The AL comprises a levitation chamber 1, conical nozzle 2, gas laser 3, pyrometer 4 (for measuring temperature), camera 5, water cooling system 6, and a vacuum pump 7. In this case an Aerodynamic Levitator from Containerless Research, Inc., of Evanston, Ill., was used, but a similar levitator having the same basic components could be used. For details on the levitator and methods for using it see *What is new on the levitation front?*, M.-L. Saboungi, J. Enderby, B. Glorieux, H. Schnyders, Z. Sungaila, S. Krishnan and D. L. Price, J., Non-Cryst. Solids (in press).

The working gas used by the levitator depends on the desired processing atmosphere, such as oxidizing, reducing or inert. In the present examples, argon, an inert gas, was used to levitate the samples, but other gases or gas combinations could be utilized depending on the desired reaction conditions. The pressure within the system should be maintained between 0.7 and 1.5 bar.

Once the reactants 9 are in place on the nozzle 2, the gas flow commences and is subsequently adjusted until the reactants 9 begin to levitate as shown in FIG. 1. The distance between the reactants and the divergent wall 8 of the levitator is enough to let the gas pass through. The position of the reactants is visually monitored (using the camera) to ensure that reactants do not touch any surface. The position of the reactants is adjusted by increasing or decreasing the flow of gas.

A water cooling system 6 cools the conical nozzle 2 to ensure that the nozzle apparatus 2 does not bend, crack, soften or otherwise deteriorate under the extreme temperatures generated by the gas laser 3 which can reach up to 3000° C.

Once the reactants 9 are levitating properly, the gas laser 3 is turned on and the heating process begins. The laser 3 is preferably a $CO_2$ laser (8=10.6 Fm) since $CO_2$ lasers are easy to work with and produce very high-temperatures in short periods of time. However, other gas laser with similar properties could be utilized.

The reactants 9 are steadily heated under the laser, the brightness (light radiation) of the reactants increasing as the temperatures rises. A filter is put in front of the camera 5 to allow viewing of the reactants 9 even at extreme levels of brightness. To ensure that the reactants 9 are totally molten one should heat the reactants to a minimum of 200° C. above the melting point of the desired compound being synthesized.

In the present case the temperature was recorded using an optical pyrometer 4 with an operating wavelength of 0.65 mm, but any similar optical pyrometer could be utilized. The optical pyrometer 4 used in this case does not read temperatures under 800° C.

Figure 3:
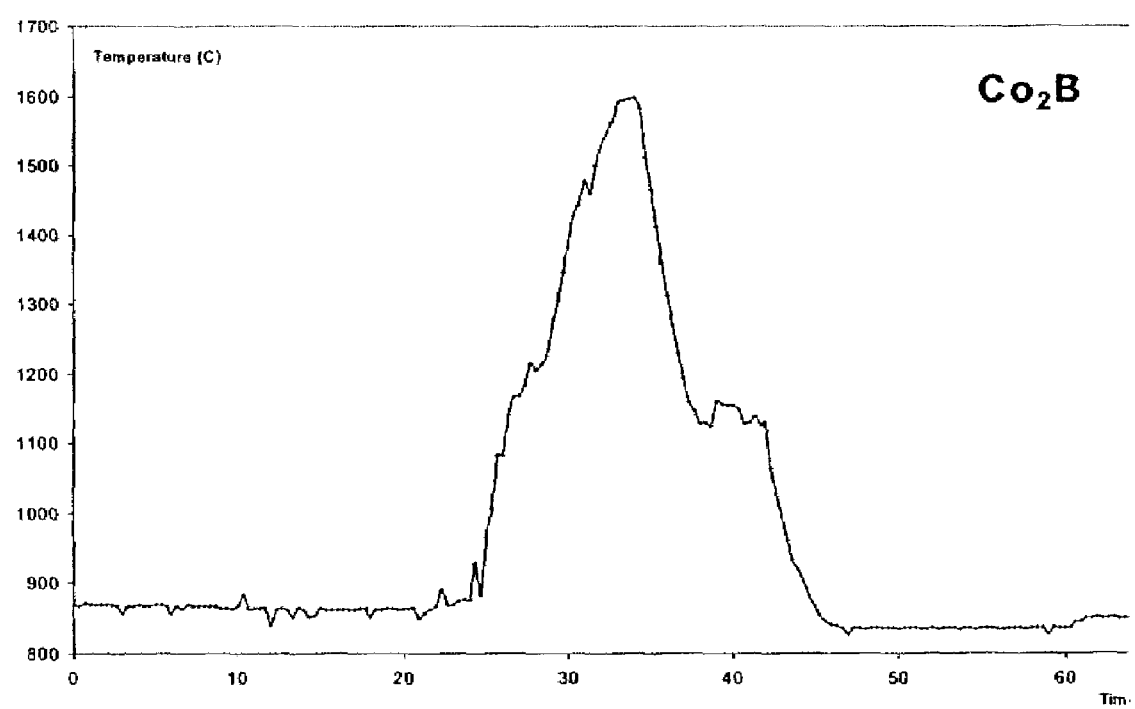
FIG. 3 shows another graph of temperature v. time for the synthesis of $Co_2B$ from Co and B in stoichiometric amounts, using the present process (sample D)

The $CO_2$ laser heats up the reactants very rapidly (within seconds), so it is very important to keep a close watch on the reactants both visually and by monitoring their temperature values. When the surfaces of the reactants begin to interact and melt, one should increase the laser power by between 20–70%. For example in the preparation of $Co_2B$ (sample D) the laser started at about 170W and was increased to 250W at about 25 seconds into the process. (see FIG. 3) A few seconds after increasing the power the reactants should completely melt into each other and the gas flow should be adjusted so that the droplet is rotating upon its axis but not oscillating laterally from side to side. When the temperature begins to stabilize, signaling that the reaction is complete (as seen in the example at about 35 seconds, see FIG. 3), the laser is either gradually turned down or completely shut down, depending upon the desired structure of the resulting material.

The final step in the process is cooling of the synthesized product. The cooling process is very important because one can often control the phase of the product (crystalline or amorphous) by regulating the cooling process. For example, turning the laser off completely and allowing the molten material to cool rapidly in the gas flow often results in the formation of amorphous phases of the material. While cooling the molten material slowly by gradually reducing the power of the laser over a period of time often results generally in the formation of materials with stable crystalline structures. Cooling the molten material over an intermediate time period may result in compounds that have both amorphous and crystalline characteristics or metastable crystalline phases. The ability to synthesize these compounds in different phases is very important for research and development purposes.

An important aspect of this invention is that it allows material synthesis while avoiding heterogeneous nucleation. The containerless processing taught by the present invention reduces potential contamination points during material synthesis which allows for the formation of amorphous and metastable phases that are very difficult to achieve using other techniques.

The purity of the materials synthesized using the present process is evident from X-ray diffraction patterns of the resulting materials. FIG. 2A shows the X-ray diffraction pattern for $Co_2B$ (the desired product), when Co was mixed with B, in stoichiometric quantities, using the present process. No other phases can be detected in the diffraction pattern.

From the foregoing description, one skilled in the art can easily ascertain the essential characteristics of the present invention and, without departing from the spirit and scope of the invention, can make changes, modifications, and substitutions to adapt the invention to various usages and conditions.

We claim:

1. A process for synthesizing a boride compound, comprising the steps of:
   a) Mixing boron and at least one metal selected from the group consisting of transition, lanthanide and actinide metals in a stoichiometric ratio corresponding to the boride compound forming a feedstock, the feedstock having a spherical pellet shape capable of levitation;
   b) Placing the feedstock on a nozzle of an aerodynamic levitator, the aerodynamic levitator having a levitation chamber, conical nozzle, a gas laser, a pyrometer, a camera, and a vacuum pump;
   c) Clearing the levitation chamber of the aerodynamic levitator of any potential contaminant gas or materials using the levitator's vacuum pump;
   d) Filling the reaction chamber of the aerodynamic levitator with a first argon;
   e) Levitating the feedstock using the aerodynamic levitator, the levitator using a second argon gas to levitate the feedstock, the flow of the second argon gas being increased or decreased to control the position of the feedstock, levitation being based on the rate of flow of the second argon gas;
   f) Heating the levitating feedstock using the gas laser to a minimum of 200° C. above the boride compound's melting point;
   g) When the elements/compounds of the feedstock begin to interact with each other and their surfaces begin to melt together, increasing the power of the laser by between 20–70%, continuing to heat the feedstock until the feedstock is completely molten and the temperature begins to stabilize, the interaction between the feedstock forming a boride compound;
   h) Cooling the resulting boride compound.

2. A process according to claim 1, wherein the boron and at least one metal are in powdered form.

3. A process according to claim 1, wherein the boron and at least one metal are compressed into a spherical pellet using a powder compressor.

4. A process according to claim 1, wherein the feedstock is placed on the nozzle of the aerodynamic levitator using a tweezers or pliers.

5. A process according to claim 1, wherein the pressure within the levitation chamber is maintained between 0.7 and 1.5 bar.

6. A process according to claim 1, wherein the laser is a $CO_2$ laser.

7. A process according to claim 1, wherein the cooling of the reactants is gradual, the power of the laser being slowly reduced, producing a crystalline material.

8. A process according to claim 1, wherein the cooling of the reactants is rapid, the power of the laser being completely shut off, producing an amorphous material.

* * * * *